United States Patent Office 2,744,035
Patented May 1, 1956

2,744,035

TEXTILE DECORATING WITH COMPOSITIONS COMPRISING AN AQUEOUS ACETIC ACID SOLUTION OF A RESINOUS POLYAMINE AND HEXAHYDRO-1,3,5-TRIACRYLYL-S-TRIAZINE

Jean C. Fierstein, Brooklyn, and Emanuel R. Lieberman, Woodside, N. Y., Zeno W. Wicks, Jr., Glen Rock, N. J., and Henry Yuska, Kew Gardens, N. Y., assignors to Interchemical Corporation, New York, N. Y., a corporation of Ohio No Drawing. Application May 4, 1953,
Serial No. 352,978

9 Claims. (Cl. 117—161)

The present invention relates to the decoration of textiles and aims to provide new and improved methods for the application of insoluble coloring material to textiles and new compositions for use in said methods.

Heretofore it has been proposed to apply pigments to textiles for decorative purposes. Several methods have been proposed for binding the inert pigments to textiles, all of which methods employ the binding action of a resin, usually a synthetic resin. The most successful of these prior art methods has the use of pigmented water-in-lacquer as described in U. S. Patents 2,222,581 and 2,222,582. The use of pigmented water-in-lacquer emulsions has been especially successful in applying pigments to textiles in the form of printed designs. However, such pigmented water-in-lacquer emulsions have not been used extensively for pigment pad-dyeing, or applying an overall solid coloration to textiles. This has been due to a large extent to the increased fire hazard involved in thinning a water-in-lacquer emulsion to pad-dyeing consistency with a volatile water-immiscible organic solvent. For printing, such emulsions need only to contain 20 to 30% organic solvent, while for pad-dyeing the solvent phase would generally have to constitute 50 to 60% of the padding liquor. Also, an increased fire hazard results from the fact that the textile fabric must be completely impregnated rather than being printed over only a portion of its area.

It is obvious that a method of decorating textiles with pigment coloring materials would be desirable for application by either a printing technique without using volatile organic solvent or resin emulsions; such a method would be especially desirable for pad-dyeing of textiles. The present invention provides such a method, especially applicable to the pad-dyeing of textiles using pigmented compositions and provides novel pigmented compositions for use in the method of the invention.

Broadly, the novel compositions of the present invention comprise an aqueous solution of a water-soluble acetate salt of a resinous polyamine, a polyacrylyl compound, and dispersed pigment, the composition being maintained at a pH of less than 6. The method of the invention comprises applying the pigmented composition to a textile, preferably by padding, and then heating to form a thermoset resin by cross-linking the polyamine with the polyacrylyl compound.

The water-soluble acetate salts of resinous polyamines that are used in the invention are described and claimed in the copending application of H. Yuska and E. R. Lieberman, Serial No. 353,001, filed May 4, 1953. The resinous polyamine salts can be described as the water-soluble salts of resinous amines containing at least 1.5% of titratable nitrogen and which are the reaction products of a resinous epoxide (obtained for instance by condensing epichlorohydrin with bisphenols) with an amine containing two or more amino nitrogens having active hydrogen. Detailed procedures for the preparation of such water-soluble acetate salts are disclosed in the aforesaid application.

The preferred polyacrylyl compound used in the present invention is hexahydro-1,3,5-triacrylyl-s-triazine which may be prepared according to known prior art methods from acrylonitrile and formaldehyde. It has the following structural formula:

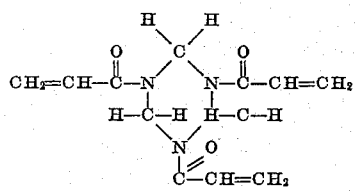

Other polyacrylyl compounds, for instance, hexahydro-1,3,5-trimethacrylyl-s-triazine, are to be considered equivalents for the purposes of this invention although they are not preferred reactants.

In accordance with the disclosure in the aforementioned application, the resinous amine containing at least 1.5% of titratable nitrogen is made by reacting a resinous epoxide with an amine containing two or more primary or secondary amino nitrogen atoms. The amino nitrogens are preferably attached to aliphatic carbon atoms. Typical examples of such amines include: ethylene diamine, propylene diamine, N-methyl propylene diamine, N-propyl propylene diamine, and polyethylene polyamines, such as diethylene triamine, triethylene tetramine, tetraethylene pentamine, etc. In order to obtain resinous amines that are soluble in aqueous acids, the amine reactant generally should not contain an aliphatic carbon chain longer than about four carbon atoms.

The resinous epoxides used in the invention are obtained by condensing polyhydric compounds, especially dihydric phenols, with polyfunctional halohydrins, especially epichlorohydrin and glycerol dichlorohydrin. These resinous epoxides contain at least one terminal 1,2-epoxide group per molecule and it is believed that it is the 1,2-epoxide group that reacts with the amine groups to give our novel resins which form water-soluble salts.

The resinous epoxides that are preferred reactants, i. e. those formed from dihydric phenols, may be further characterized as having aliphatic chains and aromatic nuclei united through ether oxygen.

The resinous epoxides that are preferred reactants are those that are commercially available and which are prepared from dihydroxy diphenyl dimethyl methane, especially 4,4'-dihydroxy diphenyl dimethyl methane or commercial mixtures of this 4,4'-isomer with lesser quantities of 2,2'-isomer and the 4,2'-isomer (i. e. Bisphenol). These resinous epoxides generally contain from one to two 1,2-epoxide groups per molecule and have epoxide equivalents of from 225 to 4000. Those having an epoxide equivalent not greater than 1000 are preferred in the present invention. They are available commercially under the trade-names Epon resins and Araldite resins. Several such resinous epoxides are listed in Table I.

Table I

| Resinous Epoxide | Average Epoxide Equivalent | M. P., ° C. |
|---|---|---|
| I | 237 | 20–28 |
| II | 487 | 64–76 |
| III | 945 | 97–103 |

The ratio of amine reactant to resinous epoxide is also critical, especially the lower ratio of amine to epoxide. In order to obtain amine resins that are soluble in dilute acids, and in order to avoid the formation of thermoset gels, it is necessary that the amine to resinous epoxide ratio be at least sufficient to give an amine resin containing at least 1.5% titratable nitrogen. Using simple diamines it is usually necessary to use 1.1 equivalents of amine to each epoxide group, considering each reactive hydrogen of the amine equivalent to one epoxide group. However, with the more complex polyethylene polyamines this ratio of equivalents of amine to epoxide equivalents can be much lower as will be illustrated hereinafter. The upper limit of the ratio of amine to epoxide group is not particularly critical and is governed chiefly by the amount that is theoretically possible to introduce into the resinous epoxide molecule, i. e. one mole of amine for each equivalent of epoxide. In general, it has been noted that the resinous amine product must contain at least 1.5% titratable nitrogen to be soluble in dilute acid, i. e. capable of forming water-soluble acid salts.

Typical resinous polyamine salts that are useful in the present invention are as follows:

A. The acetate salt of a resin containing 7.55% titratable nitrogen which is made by reacting 0.825 equivialent of resinous epoxide II (Table I) with 0.825 mole of tetraethylene pentamine.

B. The acetate salt of a resin containing 4.02% titratable nitrogen made by reacting 0.825 equivalent of resinous epoxide II with 0.818 mole of N-methyl propylene diamine.

C. The acetate salt of a resin containing 4.16% titratable nitrogen made by reacting one equivalent of resinous epoxide II with 0.79 mole of ethylene diamine.

D. The acetate salt of a resin containing 3.53% titratable nitrogen made by reacting one equivalent of resinous epoxide II with 0.66 mole of ethylene diamine.

E. The acetate salt of a resin containing 1.53% titratable nitrogen made by reacting one equivalent of resinous epoxide II with 0.99 mole of ethylene diamine.

F. The acetate salt of a resin containing 8.89% titratable nitrogen made by reacting one equivalent of resinous epoxide I with 0.84 mole of ethylene diamine.

G. The acetate salt of a resin containing 3.24% titratable nitrogen made by reacting one equivalent of resinous epoxide II with 0.25 mole of tetraethylene pentamine.

H. The acetate salt of a resin containing 1.93% titratable nitrogen made by reacting one equivalent of resinous epoxide III with 0.17 mole of diethylene triamine.

Preferred ratios of the resinous amine salt to polyacrylyl cross-linking agent are between 1 to 1 and 10 to 1. Ratios below this range can, of course, be used with a sacrifice of washfastness properties, while ratios above this range do not materially increase the washfastness and are to be avoided. While the ratio of resinous amine to cross-linking agent is important to achieve good washfastness, the optimum to use is also related to the amount of pigment color in the composition. For instance, for the relatively low concentrations of pigment required to give a light colored, or pastel shade of dyeing, a larger ratio of the resinous amine and crosslinking agent are required to bind the pigment to the textile than for darker dyeings. In general, the ratio of binder resin to pigment may vary between 1:1 and 6:1.

The amount of pigment used in the pad-dyeing composition will depend on the particular pigment used, the particular shade of color that is desired to be imparted to the textile and the amount of the composition that is applied to the textile. For instance, a composition containing, 0.1% phthalocyanine blue, with a pick-up of 70% by the textile, will produce a light blue dyeing while a composition containing 2% phthalocyanine blue will produce a much darker blue. In general, the amount of pigment will never constitute more than about 25% of the total composition.

Other conventional additives can be added to the composition without departing from the invention. Migration control agents, that is, materials which prevent the migration of pigment on the wet padded textile, can be added to insure a more even or sound dyeing. Typical migration control agents are water-soluble polymers that are precipitable by heat, e. g. methyl cellulose. Effective amounts of methyl cellulose for a pad-dyeing composition are 0.03 to 0.3% by weight, based on total composition, of an eight to 25 centipoise viscosity grade. For printing compositions, it is preferred that 0.5 to 1.5% by weight of a 1200 to 9000 centipoise grade of methyl cellulose be used. The viscosity grade of methyl cellulose refers to the viscosity of a 2% aqueous solution at 25° C. Also, dispersing agents, which are conventionally used, as aids in dispersing pigments, are advantageously employed in the compositions. Typical dispersing agents that are operable include non-ionic or cationic dispersing agents.

It is also possible to increase the washfastness of the dyed fabric by incorporating a synthetic resin latex that is compatible with the acidic composition. For instance, good results have been obtained by adding up to 4 parts (based on resin solids) of a 50% solids latex of the rubbery copolymer of a 60/40 styrene-butadiene copolymer, e. g. Polyco 350N, for each part of pigment. The synthetic rubber latices also improve the crockfastness of the dyed fabric, that is they reduce the tendency of the pigment to rub off the dyed fabric.

In accordance with the method of the present invention, textile decorating compositions prepared as described above, are applied to the textile fabric in the desired conventional manner, preferably by padding, and then the wet decorated textile is heated to a temperature of 250 to 400° F. to react the amine resin with the cross-linking agent to form an insoluble thermoset resin which binds the pigment to the textile. Although the method of the invention is operable as described above, it is preferred for best washfastness that the wet dyed fabric be dried at a temperature on the order of 230–240° F., and then treated with aqueous alkali before it is heated to complete the curing of the binder. This alkali treatment appears to accelerate the curing, or cross-linking, of the resinous poyamine with the polyacrylyl compound. For best washfastness, it is preferred that the aqueous alkali used be at least a 2 to 4% aqueous solution of an alkali, such as sodium hydroxide or sodium bicarbonate; however, improvement is obtained using relatively mild alkali, for instance a 0.2% solution of sodium carbonate. In the case of pad-dyeing of cotton, it is possible to employ strong alkali mercerization treatment to accelerate the cure of the resin and obtain better washfastness as well as increased lustre.

*Example 1.—Dark shade blue*

| | Parts |
|---|---|
| Phthalocyanine blue | 1.80 |
| Polyamine acetate salt D | 5.93 |
| Hexahydro 1,3,-triacrylyl-s-triazine | 2.07 |
| Methyl cellulose, 25 centipoise grade | 0.15 |
| Latex containing 50% of rubber copolymer of 60 parts styrene and 40 parts butadiene (nonionic), e. g. Polyco 350N | 7.20 |
| Hyamine 1622 (di-isobutyl phenoxy ethoxy dimethyl benzyl ammonium chloride) | 0.90 |
| Acetic acid | 0.17 |
| Igepal CA (p-iso-octyl phenyl decapoly-ethylene glycol) | 1.50 |
| Water | 80.28 |

The latex is added to a 20% aqueous solution of the Igepal CA and the phthalocyanine blue, dispersed as 14% slurry in the Hyamine 1622 and water, is added to the latex dispersion. A 10% aqueous solution of the methyl cellulose is then added to the dispersion and finally a mixture of the polyamine salt, the triazine, and the acetic acid in the remaining parts of water is added to give the final pad-dyeing liquor.

The above example illustrates a padding liquor containing a latex of a rubbery copolymer to obtain improved washfastness and crockfastness.

Example 2

A pad-dyeing liquor having a pH of 4–5 and containing:

| | Parts |
|---|---|
| Phthalocyanine blue | 1.80 |
| Polyamine acetate salt D | 5.93 |
| Hexahydro-1,3,5-triacrylyl-s-triazine | 2.07 |
| Water | 89.13 |
| Acetic acid | 0.17 |
| Hyamine 1622 | 0.90 | is prepared according to the procedure in Example 1 and padded on cotton cloth with about 70% pickup and then the cloth is heated to a temperature of about 240° F. to dry the cloth and thermoset the binder. The dyed fabric is a dark shade of blue having good washfastness.

Example 3

A pad-dyeing liquor having a pH of 3–6 and containing:

| | Parts |
|---|---|
| Phthalocyanine blue | 0.15 |
| Polyamine acetate salt D | 0.62 |
| Hexahydro 1,3,5-triacrylyl-s-triazine | 0.21 |
| Methyl cellulose, 25 centipoise grade | .05 |
| Hyamine 1622 | .075 |
| Acetic acid | .02 |
| Water | 98.875 | gives a light blue padding on cotton. To increase the fastness of the padding, the padding is first dried at a temperature on the order of 230 to 240° F., then padded with a 3% sodium bicarbonate solution and then heated to 250° F. for 5 minutes to complete the curing of the binder resin.

Example 4.—Dark green pad-dyeing liquor

| | Parts |
|---|---|
| Phthalocyanine green | 1.80 |
| Polyamine acetate salt E | 5.93 |
| Hexahydro 1,3,5-triacrylyl-s-triazine | 1.00 |
| Methyl cellulose, 25 centipoise grade | 0.15 |
| Hyamine 1622 | 0.90 |
| Acetic acid | 0.17 |
| Water | 90.05 |

Example 5.—Dark shade blue padding liquor

| | Parts |
|---|---|
| Phthalocyanine blue | 1.80 |
| Polyamine acetate salt A | 4.00 |
| Hexahydro 1,3,5-triacrylyl-s-triazine | 3.70 |
| Triton X-100 (p-iso-octyl phenyl decapoly-ethylene glycol) | 0.90 |
| Methyl cellulose 25 centipoise | 0.15 |
| Polyco 350N | 7.20 |
| Acetic acid | 0.25 |
| Water | 82.00 |

Example 6.—Light shade red padding liquor

| | Parts |
|---|---|
| Red ITR (Azo pigment made by coupling the 2,5-dimethoxy-5-chloroanilide of B-oxy naphthoic acid with diazotized 0-aniside-4-sulfondiethyl amide | 0.15 |
| Polyamide acetate salt D | .62 |
| Hexahydro 1,3,5-triacrylyl-s-triazine | .21 |
| Methyl cellulose, 25 centipoise grade | .05 |
| Triton X-100 | .075 |
| Acetic acid | .02 |
| Water | 98.875 |

Example 7.—Printing paste for medium shade blue

| | Parts |
|---|---|
| Phthalocyanine blue | 1.40 |
| Polyamine acetate salt D | 1.85 |
| Hexahydro 1,3,5-triacrylyl-s-triazine | 1.10 |
| Methyl cellulose, 4000 centipoise grade | 1.00 |
| Polyco 350N | 6.25 |
| Igepal CA | 1.50 |
| Hyamine 1622 | 0.70 |
| Acetic acid | 0.05 |
| Water | 86.15 |

Then centipoise grade of the methyl cellulose used in the above examples means that the particular grade of methyl cellulose, when dissolved as a 2% solution in water, has the specified viscosity at 25° C.

A typical procedure that is followed when the method of the invention is used in conjunction with a mercerizing treatment is to dry the wet padded cloth at a temperature on the order of 220–240° F., then pad it through a 25% caustic solution and then rinse thoroughly with water. The rinsed cloth is then successively rinsed with 2.5% aqueous sulfuric acid, water, and 3% aqueous ammonia. It is then heated to dry and cure the binder resin.

It will be understood that the practice of the invention is not limited to the textile decorating compositions described in the specific examples, but that various modifications can be made therein without departing from the scope of the invention as is defined in the appended claims.

We claim:

1. The method of decorating textiles which comprises: (1) applying to the textile a pigmented coloring composition comprising pigment dispersed in aqueous acetic acid solution at a pH less than 6 of (a) a resinous polyamine containing at least 1.5% nitrogen which is the reaction product of an aliphatic amine containing at least two nitrogen atoms having reactive hydrogen with a resinous epoxide having an epoxide equivalent of 225 to 1000 and at least one 1,2-epoxide group per molecule and having alternating aliphatic chains and aromatic nuclei united through ether oxygen, and (b) hexahydro-1,3,5-triacrylyl-s-triazine and (2) heating the textile.

2. The method of pigment dyeing textiles which comprises: (1) impregnating the textile with a pigmented coloring composition comprising pigment dispersed in an aqueous acetic acid solution at a pH less than 6 of (a) a resinous polyamine containing at least 1.5% nitrogen which is the reaction product of an aliphatic amine containing at least two nitrogen atoms having reactive hydrogen with a resinous epoxide having an epoxide equivalent of 225 to 1000 and at least one 1,2-epoxide group per molecule and having alternating aliphatic chains and aromatic nuclei united through ether oxygen, and (b) hexahydro-1,3,5-triacrylyl-s-triazine and (2) heating the textile.

3. The method of pigment dyeing textiles which comprises: (1) impregnating the textile with a pigmented coloring composition comprising pigment dispersed in an aqueous acetic acid solution, at a pH less than 6 of (a) a resinous polyamine containing at least 1.5% nitrogen which is the reaction product of an aliphatic amine containing at least two nitrogen atoms having reactive hydrogen with a resinous epoxide having an epoxide equivalent of 225 to 1000 and at least one 1,2-epoxide group per molecule and having alternating aliphatic chains and aromatic nuclei united through ether oxygen, and (b) hexahydro-1,3,5-triacrylyl-s-triazine, (2) drying the impregnated textile, (3) impregnating the dried textile in aqueous alkali and (4) heating the textile.

4. A textile decorating composition comprising pigment dispersed in an aqueous acetic acid solution at a pH less than 6 of (a) a resinous polyamine containing at least 1.5% nitrogen which is the reaction product of an aliphatic amine containing at least two nitrogen atoms having reactive hydrogen with a resinous epoxide having an epoxide equivalent of 225 to 1000 and at least one 1,2-epoxide group per molecule and having alternating aliphatic chains and aromatic nuclei united through ether oxygen, and (b) hexahydro-1,3,5-triacrylyl-s-triazine, wherein the ratio of resinous polyamine to polyacrylyl compound is within the range of from 1 to 1 and 10 to 1.

5. A textile decorating composition as in claim 4 wherein the resinous polyamine is the reaction product of 1.1 to 4 equivalents of ethylene diamine with one equivalent of a resinous epoxide having an epoxide equivalent of 225 to 1000 and at least one 1,3-epoxide group per molecule and having alternating aliphatic chains and aromatic nuclei united through ether oxygen.

6. A textile decorating composition as in claim 4 wherein the resinous polyamine is the reaction product of a polyethylene polyamine with a resinous epoxide having an epoxide equivalent of 225 to 1000 and at least one 1,2-epoxide group per molecule and having alternating aliphatic chains and aromatic nuclei united through ether oxygen.

7. A textile decorating composition consisting of pigment dispersed in an aqueous vehicle comprising an aqueous acetic acid solution of (a) a resinous polyamine containing at least 1.5% nitrogen and which is the reaction product of an aliphatic amine containing at least two nitrogen atoms having reactive hydrogen with a resinous epoxide having an epoxide equivalent of 225 to 1000 and at least one 1,2-epoxide group per molecule and having alternating aliphatic chains and aromatic nuclei united through ether oxygen, (b) hexahydro-1,3,5-triacrylyl-triazine and (c) methyl cellulose.

8. A textile decorating composition as in claim 6 wherein the resinous polyamine is the reaction product of 1.1 to 4 equivalents of ethylene diamine with one equivalent of a resinous epoxide having an epoxide equivalent of 225 to 1000 and at least one 1,2-epoxide group per molecule and having alternating aliphatic chains and aromatic nuclei united through ether oxygen.

9. A textile decorating composition as in claim 7 wherein the resinous polyamine is the reaction product of 1.1 to 4 equivalents of ethylene diamine with one equivalent of a resinous epoxide having an epoxide equivalent of 225 to 1000 and at least one 1,2-epoxide group per molecule and having alternating aliphatic chains and aromatic nuclei united through ether oxygen.

No references cited.